Nov. 10, 1953
J. M. ARCHAMBAULT
2,658,596
FLUID PRESSURE ENGAGED AND RELEASED CLUTCH
Filed March 4, 1950
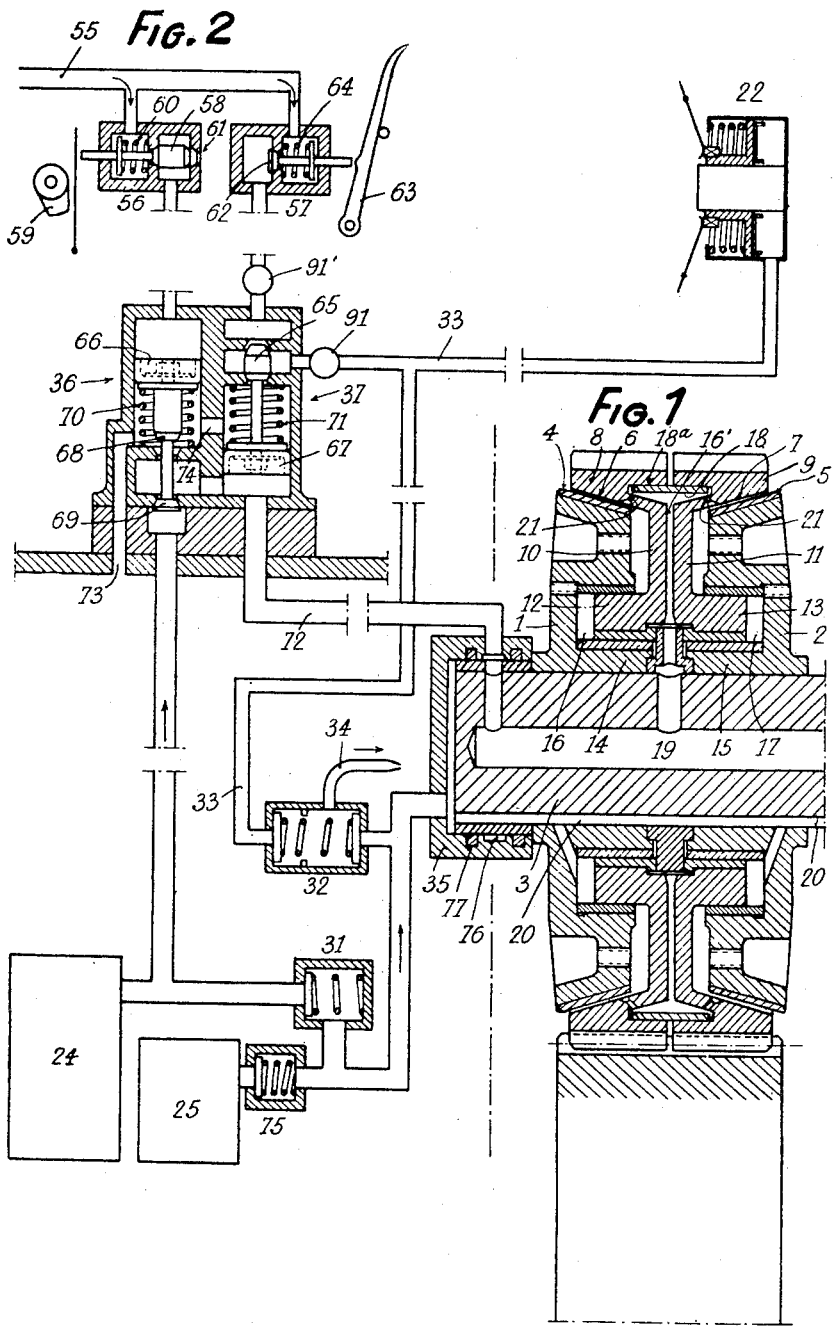
Inventor
Jean Marcel Archambault
By Michael S. Striker Agt.

Patented Nov. 10, 1953

2,658,596

UNITED STATES PATENT OFFICE 2,658,596

FLUID PRESSURE ENGAGED AND RELEASED CLUTCH

Jean Marcel Archambault, Asnieres, France

Application March 4, 1950, Serial No. 147,628

Claims priority, application France March 7, 1949

5 Claims. (Cl. 192—86)

1

Fluid controlled clutches (hydraulically controlled, for example) which are commonly used in certain gear box lifting appliances, machine tools, torque limiting devices, etc., are sometimes formed as two webs or discs having frusto-conical rims. These rims, the greatest diameters of which are the same, cooperate with bowls of corresponding shape formed to the internal wall of the driven member (toothed wheel, pulley, casing of the part to be driven). The webs are positively connected for rotation with the driving shaft but under the action of the fluid under pressure which acts between their corresponding faces (against the reaction of springs) they can move axially away from each other on the shaft which carries them. These opposite movements bring the rims of the webs into engagement with the bowls of the external member, which is thus clutched to the driving member. Such assemblies have the following disadvantages:

The movable parts which are subject to wear are enclosed and therefore are not very accessible. This renders checking of their state of wear difficult.

The declutching is effected by action of springs which are subject to deterioration or to rupture.

The fluid tightness of the chamber which receives the fluid under pressure through a bore in the driving shaft depends upon the state of the interengaged conical surfaces.

The metallic dust which is produced by wear of the conical clutching surfaces is difficult to remove.

The present invention relates essentially to a double clutch which has been designed to overcome the disadvantages set forth above. This clutch is differentiated from the analogous clutches referred to above by the fact that the webs or discs (the rims of which form frusto-conical surfaces having corresponding small bases) are no longer movable axially on the shaft which rotates them. These webs are associated with frusto-conical clutching bowls belonging respectively to the two parts which constitute either the driven member or the driving member, and which are capable of being displaced axially relatively to each other. These two parts can thus form, in combination with the external webs which surround them, double acting fluid motors. These fluid motors, under the action of a fluid under pressure, can, in this way, cause the clutching and declutching operations of the webs and the two parts of the members

2 with which they co-operate. The invention is also concerned with means which enable the control to be effected from a control station, as well as with the application of this clutch or this control to the design of a multi-speed gear box.

In the accompanying drawings which are simply by way of example.

Fig. 1 shows a pinion combined with a double clutching and declutching system in accordance with the invention.

Fig. 2 is a diagram showing the hydraulic, pneumatic or other transmission which connects a control station to a gear of the invention.

As specified in the above, the clutch in accordance with the invention is made up of two webs 1, 2, which are keyed on the driving shaft 3 so as to participate in the rotation of the latter and which cannot move axially relatively to the latter. The rim 4, 5, of these webs 1, 2, are frusto-conical, and their small bases are directed toward each other.

With these frusto-conical rims 4, 5, are associated bowls 6, 7, of corresponding shape formed on the driven member (pinion, pulley, or other element). This member is made up of two symmetrical halves 8, 9, which form parallel walls 10, 11 (included between the external webs 1, 2) as well as hubs 12, 13, mounted to turn on the hubs 14, 15 of the said webs 1, 2. The hubs 12, 13, of the two halves 10, 11, of the driven member form annular pistons in cylinders 16, 17, of the same shape formed in the hubs 14, 15, of the webs 1, 2. The space 16' between the two elements 10, 11 of the driven member is closed on the outside by a cylindrical band of spring steel 18 the ends of which are connected together. This band 18 is disposed under tension in a circular groove 18a formed for this purpose in the two parts 8, 9, of the driven member. By means of this arrangement and although the two parts 8, 9, of which the driven member is made up can move towards and away from each other, it is possible to provide between the two walls 10, 11, a chamber 16' into which can be introduced a fluid under pressure.

This introduction, which can be effected through the bore 19 in the driving shaft 3, tends therefore to move the walls 10, 11, away from each other and, in so doing, to effect the clutching by bringing each of the bowls 6, 7 of the driven member 8, 9, into engagement with the frusto-conical rims 4, 5, of the webs 1, 2 keyed on the driving shaft 3.

Similarly, by means of external grooves 20 formed on the shaft 3, it is possible to bring a fluid under pressure into each of the annular cylinders 16, 17, formed in the hubs of the fixed webs 1, 2. This fluid can thus bring about axial movement in opposite directions of the annular pistons 12, 13, formed by the hubs of the two parts 8, 9, of the driven member. As a result of this introduction, the two parts 8, 9, of this member move towards each other to effect the declutching; the bowls 6, 7, ceasing to be in contact with the frusto-conical rims 4, 5, of the webs 1, 2.

Clearly, the evacuation of the fluid or the reduction in the pressure of the fluid either in the cylinders 16, 17, of the opposed fluid motors or in the chamber 16' between the walls 10, 11 respectively corresponds to placing the common chamber 16' formed between the two walls 10, 11 under pressure or the opposed cylinders 16, 17 under pressure.

These functions, which effect the synchronised clutching or de-clutching of the two parts 8, 9, constituting the driven member, can be effected by means of a suitable distributor controlling the circulation of the liquid medium which is used.

It will be seen that by this arrangement—

1. Checking of wear can be effected by the simple measure of separating the two parts 8, 9, constituting the driven member, without effecting any dismantling.

2. The de-clutching can be very rapid if necessary.

3. The fluid tightness of the chamber 16' is independent of the state of the frusto-conical clutching surfaces.

4. Dust cannot accumulate in the central chamber 16'; moreover, the evacuation of oil through the holes 21, when de-clutching is effected, washes the frusto-conical surfaces and cools them.

5. The lubrication of the central friction surfaces of the parts 8, 9, constituting the driven member is always ensured by oil, either when de-clutching or when clutching.

The accompanying drawing (Fig. 1) assumes, by way of example, that the two parts 8, 9, of the driven member form a pinion which is to be clutched to or de-clutched from the driving shaft 3. Such an embodiment allows multi-speed gear boxes to be designed, some or all of the pinions of which are similarly mounted so that they can be put into and out of action through a fluid control, for example, an hydraulic control.

The control apparatus of the above-described structure includes:

(a) A clutch 22. This clutch 22 can be of any desired type (mechanical, electro-magnetic, hydro-pneumatic, hydro-magnetic) which is capable of being continuously slipped.

(b) A liquid fluid circuit (oil for example) comprising essentially two pumps 24, 25.

(1) Of these pumps, the pump 24 delivers the oil under two pressures; a high pressure for engaging the gear, a low pressure for ensuring the disengaging of the latter, the surplus oil delivered by this pump 24 serving for the general lubrication of the gear box.

This pump 24 comes into action as soon as the engine turns.

(2) The other pump 25 ensures the general lubrication of the box and the disengagement of the gear when the vehicle (on which the gear box is mounted) is towed and the engine is stopped.

In normal operation, this pump 25 delivers through the low pressure circuit of the first pump 24 as will be described further on.

(3) Two oil pressure regulators 31, 32 for these pumps 24, 25 one, 31, associated with the high pressure pump 24, has the function of maintaining the necessary pressure for the clutch. The other, 32, which is common to the two pumps 24, 25, has the function of maintaining a sufficient pressure for ensuring the de-clutching.

The latter regulator 32, is under the control of the circuit 33 (compressed air, for example) which ensures the declutching of the general clutch 22 in such a way that the pressure that it regulates is increased during the declutching operation.

In this way, a rapid separation of the cones 6, 7, is ensured and drag is avoided.

The excess fluid delivered by the pumps assures the general lubrication of the box in which the apparatus is located (passage 34).

(4) Oil distributor 35 fixed at the end or on the body of the shaft carrying the tooth wheel. This distributor 35 is formed by annular chambers 76 the bases of which are formed by the sealing rings 77.

The installation also comprises oil distributors 36, 37, placed outside the casing of the box for ensuring the distribution of the fluid under pressure which is required for ensuring the clutching or the de-clutching. These distributors 36, 37, can be controlled from a control station through a mechanical linkage or an electric or liquid or gaseous fluid transmission acting through a servo-motor. Naturally, passages connect these various parts for ensuring the operations which will now be described, the fluid under pressure reaching the clutch through internal passage 19 or external groove 20 formed in the shaft 3 (Fig. 1).

The connection between the control station, the clutch 22 and the mechanisms actuating the oil distributors 36, 37 (pneumatically controlled in the example shown) as well as the connection between the oil pumps 24, 25, the distributors 35 and the clutches of the various gear ratios is effected in the following manner (Fig. 2).

Off the compressed air distribution line 55, are branched two distributors 56, 57. One, 56, constituted by a valve having a double seat 58 is subjected to the opposite effects of a cam 59 (or equivalent control means) and of a spring 60. This spring 60 acts on the valve 58 which cuts off the supply of compressed air and which puts the cylinder of the piston of the servo-motor 36 of the oil distributor (Fig. 2) into connection with an oil distributor through 61.

The other distributor 57 comprises a simple valve 62 subjected to the opposite effects of a common opening lever 63 (or equivalent means) and of a closing spring 64. The action of the spring 64 is to interrupt any admission of compressed air to the valve 65 of the servo-motor of the second distributor 37. This valve 65 controls the admission of the air under pressure to the clutch 22 and to the regulator 32 (pipe 33). The manifolds 91 and 91' serve the servo-motor 37 and the pipe 33 of the clutch 22.

The distributors 36, 37, as indicated, are constituted as servo-motors, the pistons 66, 67, of which are controlled respectively by the compressed air (piston 66) and by the oil pressure (piston 67).

They are thus constituted:

The distributor 36, by an upper pneumatic piston 66 which actuates a double valve 68, 69, with alternative closing against the action of a spring 70.

The distributor 37, by the lower hydraulic piston 67 which actuates the double valve 65 with alternative closing against the action of a spring 71.

The upper valve 68 of the first servo-motor 36 controls the circulation of oil which goes back to the gear box through the pipe 72, the second servo-motor 37, the valve 68 and the pipe 73; the lower valve 69 controlling the output of the pump 24.

The upper valve 65 of the second servo-motor 37 controls the circulation of the compressed air towards the clutch 22 (pipe 33), the second valve evacuating the air through the cylinders of the two servo-motors 36, 37 (connected by the passage 74) and through the passage 73 leading into the gear box.

The outputs of the pumps 24, 25 are controlled respectively by the valves 31, 32, and their common delivery reaches on the one hand, the distributing box 35 which feeds the clutch associated with the gear, and on the other hand, the regulator valve 32; the pressure exerted by the spring on this valve is increased during the de-clutching of 22 by the pneumatic pressure (pipe 33) which determines the positive or negative control of the clutch.

The operation of this arrangement is therefore as follows: it being understood that there are as many cams 59, groups 56 (distribution), 36 and 37 (servo-motor) as there are pinions to be engaged or disengaged, the cams 59, suitably distributed around their shaft, actuating according to need, one or more groups 56. On the other hand, the arrangement comprises only one valve 31 and one valve 32 corresponding to the two pumps 24, 25. Similarly, there is only one distributor 57 for the single clutch 22.

Position of the parts after the engine has been started (Fig. 2):

The vehicle is at rest, and the external clutch 22 is engaged.

The pump 24 turns, the regulator 31 limits the pressure of the oil to the desired value for the engagement of the gears.

The excess of oil which is delivered is regulated to the low pressure necessary for the disengagement of the gears and for the lubrication of the bearings by the regulator 32.

The excess of oil which escapes from the regulator 32 is delivered by the tube 34 to the interior of the box.

The oil pump 25, which turns only when the vehicle is running, does not constitute an outlet for the pump 24, the valve 75 obstructing its exhaust.

In these circumstances, the oil under low pressure goes into the annular chambers 16 and 17 of the gear clutch, and ensures the spacing apart of the bowls 8, 9, from the corresponding fixed cones 4, 5.

By means of the lever 63, the valve 62, which sends compressed air coming from the passage 55 into the external clutch 22, is actuated.

Next, the lever 63 is allowed to come back to the rest position and the cam 59 is turned to correspond to a particular gear ratio, which has the effect of opening the valve 58, the compressed air acts on the piston 66 of the servo-motor 36 and displaces the valve 69 which puts the high pressure oil into communication with the fixed distributor 35 through the cylinder of the servo-motor 37 and the passage 72. The piston of the servo-motor 36 can move only if the air pressure to which it is subjected is sufficient to ensure the disengagement of the clutch 22. The oil goes into the axial chamber 16′, passes through the lubrication holes 21, and ensures lubrication of the conical surfaces of the clutch associated with the said gear ratio.

The pressure in the annular chamber 16′ becomes such after a moment, that the bowls 6 and 7 are forced into the cones 4, 5, and thus ensure the engagement of the gear.

During the same time, the oil pressure has increased also in the servo-motor 37 and, when it has reached a sufficiently high value, that is to say, when it is able to bring about the engagement of the corresponding pinion, the piston 67 of that servo-motor rises and acts on the double valve 65. The latter shuts off the supply of compressed air and puts the cylinder of the clutch 22 into communication with the atmosphere. The vehicle starts off.

The cam 59 is then displaced. The valve 58 shuts off the supply of compressed air and puts the cylinder of the servo-motor 36 into communication with the atmosphere. The spring 70 of the piston 66 of that servo-motor closes the double valve 68, 69, and cuts off the supply of oil to the clutch associated with the gear ratio. At the same time, the pipe 33 is put into communication with the atmosphere through the servo-motors 37, 36 (exhaust passage 73).

Simultaneously, the clutch 22 has been disengaged, the air under pressure acts on the regulator 32, compresses the spring of the latter and thus causes the oil pressure in the circuit to be raised and ensures the disengagement of the gear.

The two parts 8, 9, which constitute the pinion for this gear ratio come together abruptly and cause the oil contained in the chamber 16′ to be forced through the holes 21.

In this way, disengagement of the gear which was in action is ensured without drag, and the conical surfaces are washed of dust which could have been formed when they were in contact.

The lever 63 is next released, the valve 62 closes, the clutch 22 remains disengaged, the cam 59 is next displaced and the engagement of a gear ratio by the clutch 22 takes place in the manner described for the starting up of the vehicle.

It will be understood that it is possible to combine various cams 59 and the single declutching lever 63 so that the operations may be effected in the desired order.

The compressed air control can also be replaced by an electric control, a commutator of which would ensure the distribution of current to the servo-motors 36, 37, which, in that case, should be electro-valves, without modifying the operation.

The pneumo-hydraulic control system described above, controlled mechanically or electrically, can clearly be used whenever it is a question of coupling (or uncoupling) two rotary parts one of which can be rectilinearly reciprocated relatively to that with which it co-operates, and indeed, whatever may be the form of the mechanism for driving by contact (clutch with direct or inverted cones, dogs, etc.).

I claim:

1. A fluid operated clutch arrangement comprising, in combination, a rotatably mounted shaft; at least one circular first clutch member fixedly mounted on said shaft concentrically with the same so as to rotate therewith, said first clutch member having an outer surface portion; at least one second circular clutch member mounted concentrically about said first shaft and slidably in the axial direction thereof for movement toward and away from said first clutch member, said second clutch member having a surface portion located adjacent to the outer surface portion of said first clutch member so as to frictionally engage the same when said second clutch member is moved toward said first clutch member, and said second clutch member being formed with at least one bore passing therethrough and forming an opening in said surface portion of said second clutch member; first fluid pressure means operatively connected to said second clutch member for moving the same away from said first clutch member so as to disengage said first and second clutch members; and second fluid pressure means operatively connected to said second clutch member for moving the same toward said first clutch member so as to engage said first and second clutch members, said second fluid pressure means communicating with said bore so that fluid will flow through the latter onto said surface portions of said clutch members when the latter are disengaged, the engagement of said surface portions closing said opening in said surface of said second clutch member to prevent the flow of fluid through said bore when said clutch members are engaged.

2. A fluid operated clutch arrangement comprising, in combination, a rotatably mounted shaft; a pair of circular first clutch members fixedly mounted on said shaft in spaced apart relation with respect to each other, said first clutch members each having a frusto-conical outer surface portion; cylinder means mounted on each of said first clutch members on the side thereof located nearest the other first clutch member; a pair of circular second clutch members slidably and concentrically mounted on said shaft between said first clutch members, said second clutch members each having a frusto-conical surface portion located adjacent to the frusto-conical surface portion of one of said first clutch members so as to matingly engage the same when said second clutch members are respectively moved toward said first clutch members, said second clutch members being located apart from each other so as to form a space therebetween which is increasable and decreasable as said second clutch members are moved away from and toward each other; piston means mounted on the side of each second clutch member which is most distant from the other second clutch member, each of said piston means being slidably located in each of said cylinder means, respectively; sealing means connected to the side of each second clutch member which is nearest the other second clutch member so as to provide an expandable and contractible fluid tight chamber in said space between said second clutch members; and fluid pressure means for alternately supplying fluid under pressure to said cylinders and to said fluid tight chamber so as to thereby control the movement of said second clutch members with respect to said first clutch members.

3. A fluid-operated clutch arrangement comprising, in combination, a rotatable shaft; a pair of fixed clutch members fixedly mounted on said shaft, spaced from each other and each having a frusto-conical surface portion; cylinder means on each of said fixed clutch members on the inner face thereof confronting the other fixed clutch member; a pair of rotatable clutch members mounted between said fixed clutch member concentrically with and rotatably about said rotatable shaft and slidably in axial direction thereof, each of said rotatable clutch members having a frusto-conical surface portion located adjacent to the frusto-conical surface portion of the adjacent fixed clutch member so as to matingly engage the same when said rotatable clutch members are slid against the respective stationary clutch members, forming at least in such position a space between the inner confronting faces of said rotatable clutch members; piston means mounted on the outer side of each rotatable clutch member and projecting into the cylinder means of the corresponding stationary clutch member; sealing means connecting the inner confronting faces of said rotatable clutch members so as to fluid-tightly seal the space between said clutch members and thus form a fluid-tight chamber between them; and fluid supply means for alternately supplying fluid under pressure to said cylinders and to said fluid-tight chamber so as to thereby control the movement of said rotatable clutch members with respect to said fixed clutch members.

4. A fluid-operated clutch arrangement comprising, in combination, a rotatable shaft; a pair of fixed clutch members fixedly mounted on said shaft, spaced from each other and each having a clutching surface portion; a pair of rotatable clutch members mounted between said fixed clutch members concentrically with and rotatable about said rotatable shaft and slidably in axial direction thereof, each of said rotatable clutch members having a clutching surface portion adapted to engage the clutching surface portion of said adjacent fixed clutch member when slid against the same, forming at least in such position a space between the inner confronting faces of said rotatable clutch members; annular cylinder means on each of the clutch members of one pair of clutch members on the face thereof confronting the corresponding clutch member of the other pair of clutch members; annular piston means on each of the clutch members of the other pair of clutch members engaging the annular cylinder means in the corresponding clutch member of the other pair of clutch members; sealing means connecting the inner confronting faces of said rotatable clutch members so as to fluid-tightly seal the space between said clutch members and thus form a fluid-tight chamber between them; and fluid supply means for alternately supplying fluid under pressure into the space between said cylinders and the corresponding pistons sliding therein and to said fluid-tight chamber so as to thereby control the movement of said rotatable clutch members with respect to said fixed clutch members.

5. A fluid-operated clutch arrangement comprising, in combination, a rotatable shaft; a pair of fixed clutch members fixedly mounted on said shaft, spaced from each other and each having a clutching surface portion; a pair of rotatable clutch members mounted between said fixed clutch members concentrically with and rotatable about said rotatable shaft and slidably in axial direction thereof, each of said rotatable clutch members having a clutching surface portion adapted to engage the clutching surface portion of said adjacent fixed clutch member when slid against the same, and said rotatable clutch members forming between themselves a first space and forming a pair of additional spaces respectively located between each fixed clutch member and the rotatable clutch member located adjacent thereto; a pair of sealing means respectively located in said pair of additional spaces and respectively interconnecting each fixed clutch member with the rotatable clutch member located adjacent thereto to seal said pair of additional spaces during movement of said rotatable clutch members toward and away from said fixed clutch members; a third sealing means located in said first space and interconnecting said rotatable clutch members so as to fluid-tightly seal said first space between said rotatable clutch members and thus form a fluid-tight chamber between them; and fluid supply means for alternately supplying fluid under pressure into said first space and into said pair of additional spaces so as to thereby control the movement of said rotatable clutch members with respect to said fixed clutch members.

JEAN MARCEL ARCHAMBAULT.

References Cited in the file of this patent

UNITED STATES PATENTS

| Number | Name | Date |
|---|---|---|
| 356,085 | Woodruff | Jan. 11, 1887 |
| 796,989 | Enrica | Aug. 15, 1905 |
| 1,254,951 | Ward | Jan. 29, 1918 |
| 1,472,930 | Mayer | Nov. 6, 1923 |
| 1,579,540 | Jackson | Apr. 6, 1926 |
| 1,806,158 | Giger | May 19, 1931 |
| 2,115,097 | Durham | Apr. 26, 1938 |
| 2,136,971 | Fleischel | Nov. 15, 1938 |
| 2,203,296 | Fleischel | June 4, 1940 |
| 2,483,521 | Blanchette | Oct. 4, 1949 |

FOREIGN PATENTS

| Number | Country | Date |
|---|---|---|
| 34,408 | Denmark | Nov. 16, 1922 |
| 577,438 | Great Britain | May 17, 1946 |